United States Patent [19]

Julius

[11] Patent Number: 4,765,212
[45] Date of Patent: Aug. 23, 1988

[54] CHIP REMOVER FOR MACHINES WHICH PERFORM CUTTING OPERATIONS, ESPECIALLY ON METAL WORKPIECES

[75] Inventor: Rolf Julius, Wülfrath, Fed. Rep. of Germany

[73] Assignee: Julius Maschinenbau GmbH, Wuelfrath, Fed. Rep. of Germany

[21] Appl. No.: 28,260

[22] Filed: Mar. 20, 1987

[30] Foreign Application Priority Data

Mar. 20, 1986 [EP] European Pat. Off. ........ 86103817.2

[51] Int. Cl.⁴ ...................... B65G 33/14; B23Q 11/00; B23B 25/02
[52] U.S. Cl. ............................. 82/34 R; 29/DIG. 50; 29/DIG. 94; 29/DIG. 100; 82/DIG. 2; 83/149; 83/161; 198/722; 408/67; 409/137; 493/342
[58] Field of Search .......................... 82/34 R, DIG. 2; 198/722; 408/67, 68; 409/137; 29/DIG. 50, DIG. 94, DIG. 100; 83/149, 161; 493/342

[56] References Cited

U.S. PATENT DOCUMENTS

| | | | |
|---|---|---|---|
| 1,014,442 | 1/1912 | Berry | 408/67 |
| 2,220,425 | 11/1940 | Potter | 82/DIG. 2 |
| 2,938,229 | 5/1960 | Christie | 198/722 |
| 3,141,545 | 7/1969 | Holland | 198/722 |
| 3,478,377 | 11/1969 | Stoker | 408/67 |

FOREIGN PATENT DOCUMENTS 2048260 4/1972 Fed. Rep. of Germany ..... 82/34 R

Primary Examiner—Frederick R. Schmidt
Assistant Examiner—William E. Terrell
Attorney, Agent, or Firm—Felfe & Lynch

[57] ABSTRACT

Chip remover for machines which perform a machining operation, especially on metallic workpieces, such as strip edging machines, turning machines, etc. The chip remover has a stretched spiral rotating about its longitudinal axis with successive turns spaced apart from one another. The free upper end of the spiral extends into the chip discharge area of the machining tool. This spiral carries the chips away from the area about the tool to assure unhampered machining. The spiral is in the form of a hollow helix and is surrounded, on the outside, with only minimal clearance, by a non-rotating guide tube having an open-topped slot running lengthwise of the tube. The upper end of the helix extends freely out of the tube.

11 Claims, 2 Drawing Sheets

CHIP REMOVER FOR MACHINES WHICH PERFORM CUTTING OPERATIONS, ESPECIALLY ON METAL WORKPIECES

BACKGROUND OF THE INVENTION

The invention relates to a chip remover for machines such as edging machines, turning machines etc., which perform cutting operations especially on metal workpieces. The chip remover has a screw rotating about its longitudinal axis, provided with spiral turns spaced apart from one another, while the free upper end of the screw projects into the chip discharge area of the cutting tool of the machine. The screw carries the chips away from the area around the tool to assure unhampered machining.

A chip remover of the kind described above is disclosed in the applicant's published German patent application DE-OS 3 345 041 as part of an edging machine for machining the edges of metal strips. In this chip remover the chips produced at the tool are withdrawn by means of a rotating spiral or screw. In this case, however, it can easily happen that the chip curls will roll with the screw without being displaced by it. According to the published patent application referred to above, this effect can be prevented by mounting a guide or a rod beside the screw, but even this arrangement has not proven sufficiently reliable in operation. In this arrangement, the rolling of chips with the screw in the upper part of the latter is largely prevented, but in the bottom part of the screw chip pile-ups can occur since the chips do not reliably separate from the screw after reaching its bottom end. This results in increased wear, or even in jamming of the chip remover and necessitates constant supervision as well as timely manual intervention each time a chip pile-up occurs. Under some circumstances the machine must be stopped for safety reasons.

The problem is, therefore, to create a chip remover, of the kind described above, which will avoid the above-described disadvantages and will assure a reliable, disturbance-free and interruption-free removal of chips without the need for manual intervention. The chip remover must furthermore be resistant to wear and be adaptable to different machines and tools.

SUMMARY OF THE INVENTION

The solution of this problem is achieved, according to the present invention, by a chip remover of the kind described above, in which the screw is in the form of a hollow helix, and is surrounded with very small clearance by a non-rotating guide tube having a slot running lengthwise that is open at the top, with the upper end of the helix projecting freely out of the tube.

In the chip remover according to the invention, the special configuration of the helix and of the guide tube surrounding it has the result that the chips produced at the tool are reliably caught by the helix and are carried away while being secured against rolling with the helix by the slot in the guide tube. At the bottom end of the helix the transported chips are sheared off by cooperation with the end of the slot, and then the chip portions outside of the helix and guide tube drop freely down along the outside of the chip remover. The chip portions still inside of the helix drop through its hollow center. Any packing of chips at the bottom end of the helix is thus reliably prevented. The chopping of the chips also advantageously reduces the bulk of the waste.

Since no great drag can be placed on the helix, its bearings and its drive are relieved of stress and thus have longer life and greater reliability of operation for the same or even lighter construction.

For the achievement of optimum shearing action between the bottom end of the helix and the end of the slot, provision is made in the lower part of the tube, remote from the tool, for the course of the slot to turn and continue more in the direction of the circumference of the tube and in the direction of the rotation of the helix, with a pitch contrary to the pitch of the helix. This results in a scissors-like shearing action, which reduces the amount of force and torque that must be produced, and reduces the wear on the involved parts of the chip remover.

In further development, the continuation at the bottom of the slot can be provided with a cutting edge confronting the helix. This provides for a still better shearing and cutting action in the chopping of chips. To assure a long cutting edge life in the slot, the cutting edge can be a hard metal insert set at the appropriate point in the guide tube. Likewise, the edge of the helix confronting the cutting edge in the slot can be equipped with a hard metal insert.

To assure that the chips caught by the upper end of the helix will be drawn into the slot of the guide tube, provision is made for the upper end of the tube to be cut away spirally with a pitch contrary to the pitch of the helix, such that, in the area of the slot, an abrupt change in the level of the end of the tube will result. In this way, the helix, during its rotation, will run abruptly against the upward extension of the tube. This will stop any rolling of the chips after no more than one revolution of the helix, providing for an immediate removal of the chips from the tool area.

With particular regard to reliability of operation and stability, embodiments of the chip remover have proven desirable in which the width of the slot in the guide tube is about 0.05 to 0.2 times the circumference of the tube, and in which the length of the bottom continuation of the slot is about 0.25 to 0.5 times the circumference of the tube. As regards the configuration of the helix, it has been found to be especially advantageous, from the viewpoint of strength and reliability of operation, for the cross-section of the individual helical turns to be rectangular, with the outer faces thereof running parallel to the inside surface of the guide tube with a nearly minimal clearance.

To avoid the accumulation of chips at the hollow foot of the helix, which might lead to impairment of operation, provision is made for the helix to have a flaring, hollow foot portion, surrounded by a correspondingly flaring tube foot portion. This leaves a clear passage for the chips through the hollow foot portion of the helix, even though they might expand in bulk after they are cut, as a result of previously existing mechanical stress.

Since the helix performs a rotational movement in operation, it must be appropriately journaled and driven. However, to assure disturbance-free operation, the transport of the chips must not be interfered with. Therefore, substantially hollow cylindrical journal and drive means are provided under the foot of the helix and are integrated with, or positively connected to the helix. The free passage for the chips from the interior of the helix, as described in the preceding paragraph, is maintained also in the area of the journal and drive. At the same time, these parts of the chip remover, in the arrangement described, do not interfere in the case of cramped conditions in the area of the tool. The journal parts, for example, can be provided with roller friction bearings, placed on their exterior, which will have a very low friction even under heavy loading. The driving member, for example, can be provided with teeth on its exterior for engagement by a gear or a drive chain.

To be able to adapt the chip remover to different tools and tool stations, the chip remover preferably has means for height adjustment with respect to the workpiece and/or to the tool that produces the chips. To increase the possibility of adaptation, the chip remover can furthermore be provided with means for horizontal displacement with respect to the workpiece and/or to the cutting tool and/or with means for the adjustment of the inclination of its longitudinal axis from the vertical.

Finally, to cool and reduce friction between moving parts of the chip remover, means are provided for the feeding and return of coolant and lubricant in the area between the helix and the inside of the tube and/or the area of the cutting edges on the slot in the tube. Such lubricants and coolants are used especially where the removal of large amounts of chips and chips of especially tough material is involved. The means can be passages integrated into the wall of the guide tube with openings at the appropriate places, or flexible tubes which can be positioned manually.

For a full understanding of the present invention, reference should now be made to the following detailed description of the preferred embodiments of the invention and to the accompanying drawings.

DESCRIPTION OF THE PREFERRED EMBODIMENT

Figure 1:
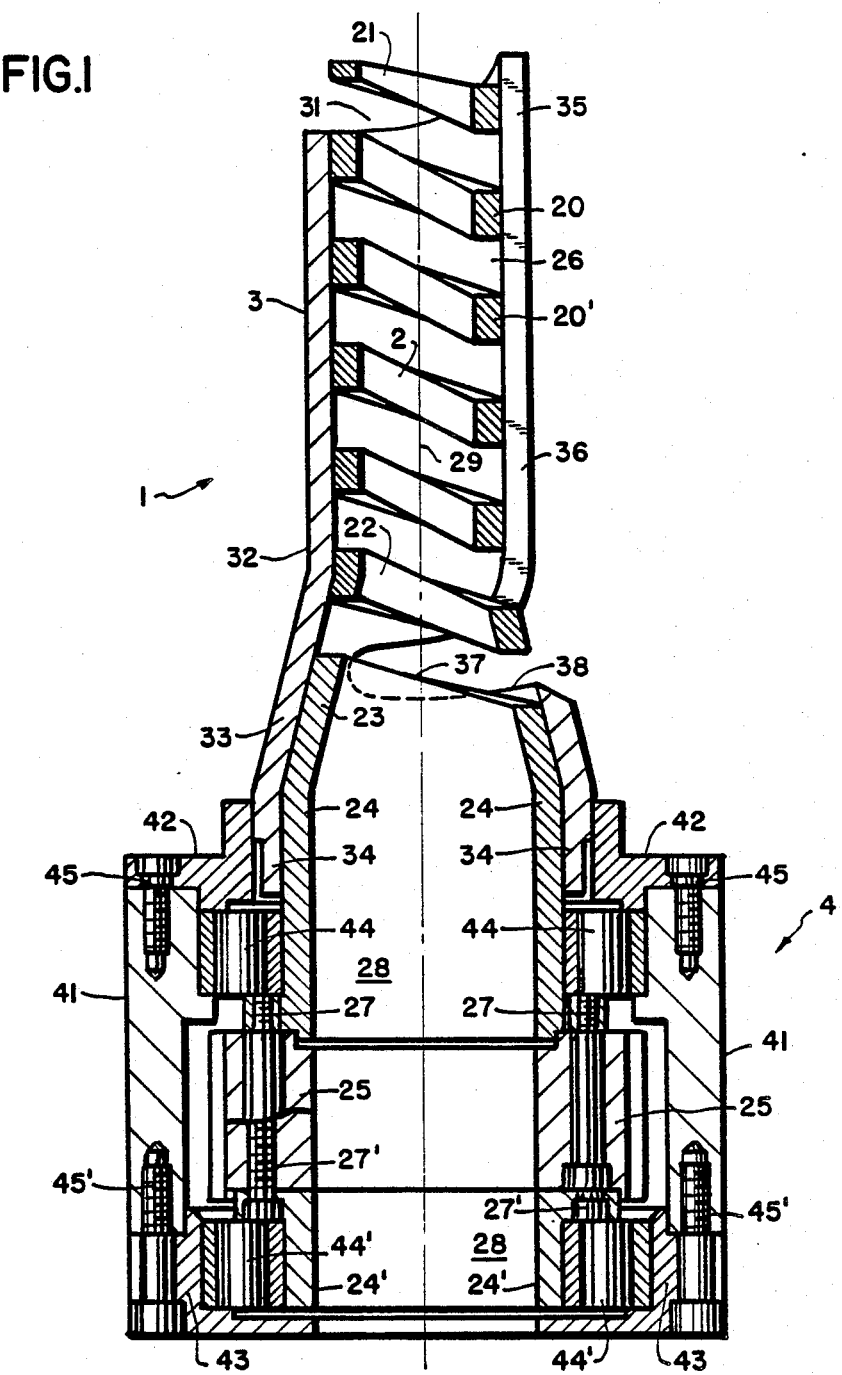
FIG. 1 is a longitudinal cross-sectional view of a chip remover according to the invention.

The preferred embodiment of the present invention will now be described with reference to FIGS. 1 and 2 of the drawings. Identical elements in these two figures are designed with the same reference numerals.

Figure 2:
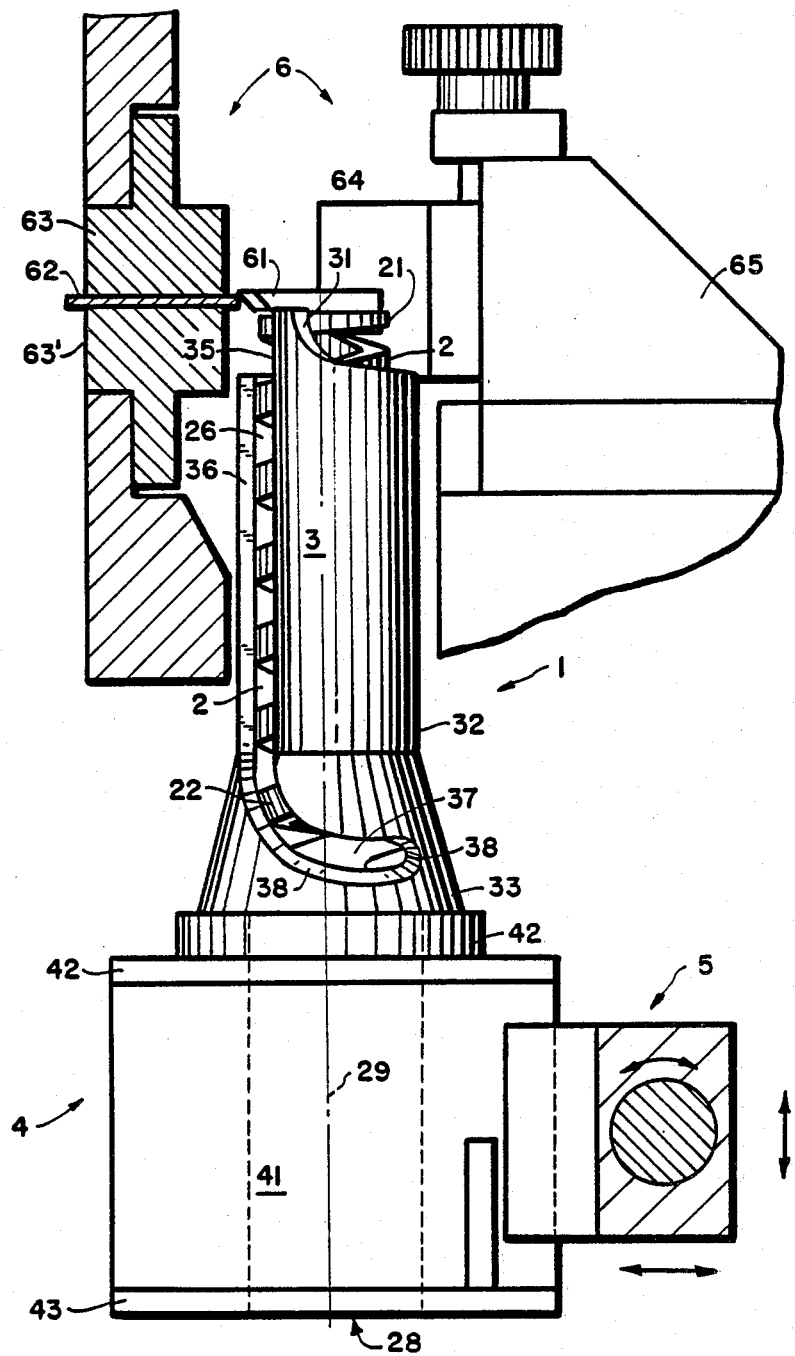
FIG. 2 is a side elevational view of the chip remover of FIG. 1, installed in a strip edging machine.

As it can be seen both in FIG. 1 and in FIG. 2, the preferred embodiment of the chip remover consists essentially of a helix 2, a guide tube 3 surrounding it, and a base 4 holding both parts. The helix 2 is a stretched hollow spiral whose adjacent coils 20 and 20' are separated by a gap 26. At its upper end 22, the upper helix tapers to a point. In its lower portion 22 the helix 2 flares and then merges with a truncoconical foot portion 23. Here it is integral with a hollow cylindrical journal member 24. The cavity in the hollow coil 2 therefore is continued by a cavity 28 which at first flares and then assures a constant diameter.

Externally, the helix 2 including the foot 23 and the upper part of the journal member 24 is surrounded by the guide tube 3 with a minimal clearance from the inside 30 of the tube. Accordingly, the guide tube 3 also flares at its lower portion 32 to form a foot 33 which is adjoined at the bottom by a hollow cylindrical mounting part 34. The guide tube 3 is provided with a slot 36 running lengthwise of the tube 3, which at its bottom portion 32 or at the foot 33 of the tube continues more in the direction of the circumference of the tube 3 with a pitch that is contrary to the pitch of the helix 2. This continuation of the slot 36 is indicated in the figures by the reference number 37.

As seen in both figures, furthermore, the upper end 31 of the guide tube 3 is cut away spirally, the pitch of the tube end 31 being contrary to the pitch of the helix. The spiral-shaped cut is designed such that there is an abrupt change in the level of the tube wall at the upper end of the slot 36. When the helix 2 rotates, its upper end runs against the higher portion 35 of the wall of the guide tube 3.

The journal and the drive of the helix 2 of the chip remover can be seen in the lower part of FIG. 1. On the circumference of the previously mentioned journal member 24 of the helix 2 there is disposed a roller bearing 44 whose outer side lies against the inside of a casing 41 of the base 4. The bottom the journal member 24 adjoins a drive member 25 which is provided in this embodiment with teeth on its outer side for engagement by a gear. This drive member 25 is joined to the journal member 24 by means of screw threads 27. The drive member 25 is followed at the bottom by a support 24' which is also joined to the drive member 25 by screw threads, here identified at 27'. The support 24' has on its exterior a roller bearing 44' which, in turn, engages the bottom part 43 of the base 4. The bottom part 43 of the base 4 and the base casing 41 are joined together by screws 45'. The base casing 41 is terminated at the top by a cover ring 42 affixed to the mounting part 34 of the guide tube 3. The cover ring 42 and base casing 41 are also joined together by screws 45. Since both the two journal members 24 and 24' and the drive member 25 are of substantially hollow cylindrical shape, a continuous transport cavity 28 is formed running from the helix 2 all the way through the bottom part 43 of the base 4.

FIG. 2 best illustrates the shape of the slot 36 with its continuation 37 in the guide tube 3. As can also be seen in FIG. 2, the continuation 37 of the slot 36 is provided with a cutting edge 38 which confronts the helix 2 and its bottom part 22 running along the inside of the guide tube 3. The continuation 37 of the slot 36 is provided with a cutting edge 38 which confronts the helix 2 and its bottom part 22 running along the inside of the guide tube 3. At the bottom is the base 4 of the chip remover 1, this base being closed laterally and at the top as seen in the figure. Thus chips or fragments are unable to get into the journal and drive parts.

In the embodiment shown, provision is also made to permit adjustment of the chip remover 1 in several coordinates. For this purpose means 5 are provided, which are mounted laterally on the base 4, and which permit an adjustment of the height, horizontal position and inclination from the vertical of the chip remover. Such means are well known in the art and therefore do not need to be described in detail.

Also seen in FIG. 2 is the integration of the chip remover into a machine: a strip edging machine 6 in this case. In a strip edging machine, a metal strip 62 which is guided between two linear guides 63 and 63" is machined by a tool 61, which in this case is a cutting tool for relieving the edge of a strip. The tool 61 is held in a tool holder 64 and can be adjusted in its position relative to the metal strip 62 by means of a tool rest 65. The upper end 41 of the helix 2 of the chip remover is disposed directly adjacent the tool 61. This assures that chips produced by the tool 61 will be caught by the chip remover and carried away. As can be seen in the figure, the chip remover 1 according to the present invention can easily be installed even in cramped quarters between the linear guide tracks 63 and 63' and their supports on the one hand and the tool rest 65 on the other.

The manner of operation of the chip remover 1 will now be described with reference to FIG. 2. Chips produced by the tool 61 are caught by the free end 21 of the helix 2 of the chip remover 1 and pulled slightly by the rotary movement of the helix 2. After no more than one revolution of the helix 2 the chips or the cluster of chips encounters the higher tube section 35 projecting upward at the upper end 31 of the guide tube 3. The chips are thus prevented from rotating any further and instead are pulled downwardly by the rotating helix, along the slot 36, until they reach the bottom part 22 of the helix and bottom part 37 of the slot 36. In this area of the chip remover 1, the chips are severed by a shearing action through the cooperation of the cutting edges 38. After that, the chip portions projecting outwardly beyond the tube bottom 33 and beyond the cover ring 42 and the outside of the base casing 41 of the base 4 can drop freely downwardly. The inwardly projecting chip portions, i.e., projecting into the interior of the tube 3 and coil 2, can also drop freely downwardly after being cut, through the hollow space 28 inside of the helix foot 23, the tube foot 33 and the journal and drive members 24, 24' and 25 disposed in the base 4. Accumulations or jam-ups of chips in any part of the chip remover 1 are thus effectively prevented.

There has thus been shown and described a novel chip remover for machines which perform cutting operations, especially on metal workpieces, which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. In a chip remover for machines which perform a machining operation, especially on metal workpieces, such as strip edging machines, and by means of which the chips produced by the machine are carried away from the area surrounding the chip-producing tool to assure an unhampered machining operation, wherein the chip remover includes a stretched helix rotating about its longitudinal axis with successive turns spaced apart at a distance from one another, said helix having a driven end and a free end, said free end extending into the area of emergence of chips from the chip-producing tool of the machine, the improvement wherein said helix is hollow and is surrounded externally by a non-rotating guide tube with an open end and an open-ended slot which is substantially narrower than the width of said tube and extends in the lengthwise direction of said tube, said free end of said helix projecting freely from said open end of said tube, and wherein said slot extends in the longitudinal direction of said tube from said open end to the opposite, tool-remote part of said tube, and then continues from said longitudinal direction in a partly circumferential direction along said tube and in the direction of rotation of said helix with a pitch contrary to the pitch of said helix.

2. The chip remover according to claim 1, wherein said lower continuation of said slot is provided with a cutting edge facing said helix.

3. The chip remover according to claim 1, wherein the width of said slot in said guide tube amounts to about 0.05–0.2 times the circumference of said tube, and wherein the length of said lower continuation of the slot amounts to about 0.25–0.5 times the circumference of said tube.

4. The chip remover according to claim 1, wherein said free end of said tube is cut away helically with a pitch contrary to the pitch of said helix, such that in the area of said slot an abrupt change in height of the tube end results, said helix moving adjacent the higher tube area during its rotation.

5. The chip remover according to claim 1, wherein the cross-section of the individual helical turns of said spiral is rectangular, the outer side thereof running, with a nearly minimal clearance, parallel to the inside of said guide tube.

6. The chip remover according to claim 1, wherein said helix has a flaring, hollow foot portion which is surrounded externally by a similarly flaring foot portion of said tube.

7. The chip remover according to claim 1, further comprising substantially hollow cylindrical journals and drive members disposed at the foot of said helix which are integral with or positively joined to said helix.

8. The chip remover according to claim 1, further comprising means for longitudinal adjustment thereof with respect to the machining tool.

9. The chip remover according to claim 1, further comprising means for lateral displacement thereof in relation to the machining tool.

10. The chip remover according to claim 1, further comprising means for adjustment of the inclination of its longitudinal axis in relation to the vertical.

11. The chip remover according to claim 1, further comprising means for the feeding and removal of coolant and lubricant in the area between said helix and the inside of said tube.

* * * * *